(12) United States Patent
Noble et al.

(10) Patent No.: US 9,690,384 B1
(45) Date of Patent: Jun. 27, 2017

(54) FINGERTIP LOCATION DETERMINATIONS FOR GESTURE INPUT

(71) Applicant: Amazon Technologies, Inc., Reno, NV (US)

(72) Inventors: Isaac S. Noble, Soquel, CA (US); David A. Fotland, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 240 days.

(21) Appl. No.: 13/627,261

(22) Filed: Sep. 26, 2012

(51) Int. Cl.
*G06F 3/01* (2006.01)
*G06F 3/042* (2006.01)
*G06F 3/044* (2006.01)

(52) U.S. Cl.
CPC .............. *G06F 3/017* (2013.01); *G06F 3/044* (2013.01); *G06F 3/0425* (2013.01); *G06F 2203/04106* (2013.01)

(58) Field of Classification Search
CPC ........ G06F 3/011; G06F 3/017; G06F 3/0425; G06F 3/0426; G06F 2203/0338; G06F 2203/04106; G06F 3/0416
USPC .......................................... 345/173
See application file for complete search history.

(56) References Cited

U.S. PATENT DOCUMENTS

| | | | |
|---|---|---|---|
| 2008/0158172 A1* | 7/2008 | Hotelling et al. | 345/173 |
| 2008/0273755 A1* | 11/2008 | Hildreth | 382/103 |
| 2008/0309631 A1* | 12/2008 | Westerman et al. | 345/173 |
| 2009/0040193 A1* | 2/2009 | Geaghan | G06F 3/0416 345/174 |
| 2010/0103092 A1* | 4/2010 | Hsieh et al. | 345/156 |
| 2010/0194713 A1* | 8/2010 | Kawashima et al. | 345/175 |
| 2010/0245289 A1* | 9/2010 | Svajda | 345/175 |
| 2010/0295810 A1* | 11/2010 | Nagata et al. | 345/173 |
| 2011/0007021 A1* | 1/2011 | Bernstein | G06F 3/0416 345/174 |
| 2011/0018795 A1* | 1/2011 | Jang | 345/156 |
| 2011/0090149 A1* | 4/2011 | Larsen | A63F 13/10 345/158 |
| 2011/0193809 A1* | 8/2011 | Walley | G06F 3/044 345/173 |
| 2012/0038627 A1* | 2/2012 | Sung | G06T 7/0042 345/419 |
| 2012/0207345 A1* | 8/2012 | Tang | 382/103 |
| 2013/0050069 A1* | 2/2013 | Ota | G06F 3/011 345/156 |

(Continued)

*Primary Examiner* — Kent Chang
*Assistant Examiner* — Sujit Shah
(74) *Attorney, Agent, or Firm* — Polsinelli LLP (57) ABSTRACT

A user can use a finger, or other such object, to provide input to a computing device. The finger can be positioned and/or oriented at a distance from the device, and the device can determine an input that the user is attempting to provide based on a position, motion, or gesture associated with the finger. One or more cameras can capture image information, which can be analyzed to attempt to determine the location and/or orientation of the finger. If the finger is at least partially outside a field of view of the camera(s), the device can use another sensor (e.g., EMF) to determine one or more potential locations of the fingertip. The image information then can be used to determine which of the potential locations actually corresponds to the fingertip by analyzing that portion of the finger or hand represented in the image information.

22 Claims, 7 Drawing Sheets

(56) References Cited

U.S. PATENT DOCUMENTS

2013/0093731 A1* 4/2013 Scharff ................ G06F 1/1686
                                                              345/177

* cited by examiner

FINGERTIP LOCATION DETERMINATIONS FOR GESTURE INPUT

BACKGROUND

As computing devices offer increased processing capacity and functionality, users are able to provide input in an expanding variety of ways. For example, a user might be able to control a computing device by performing a motion or gesture at a distance from the computing device, where that gesture is performed using a hand or finger of the user. For certain devices, the gesture is determined using images captured by a camera that is able to view the user, enabling the device to determine motion performed by that user. In some cases, however, at least a portion of the user will not be within the field of view of the camera, which can prevent the device from successfully determining the motion or gesture being performed. While capacitive touch approaches can sense the presence of a finger very close to a touch screen of the device, there is still a large dead zone outside the field of view of the camera that prevents the location or movement of a finger of the user from being determined.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, approaches discussed herein utilize a combination of imaging and sensor-based detection approaches in order to determine motions, gestures, or other actions performed by a user, even when those motions, gestures, or actions are performed at least partially outside a field of view of one or more cameras of a computing device. A computing device can have multiple cameras for capturing images (e.g., still or video) of a feature of a user (or object being held by the user, etc.). A computing device in accordance with various embodiments can also use a field-sensing approach, such as capacitive touch detection, to assist in determining a location of one or more features of the user when the user is near the device, which can include being in the dead zone between the fields of view of cameras on the device.

In at least some embodiments, one or more cameras can capture image information that can be analyzed to determine a relative position of a user's fingertip. If the fingertip falls outside the field of view of the camera(s), the device can attempt to estimate the position of the fingertip by analyzing image data for the portion of the user's finger and/or hand that is within the field of view. The computing device can also attempt to use another sensor on the device to assist in determining the fingertip position. If a sensor cannot accurately detect the fingertip, or if no such fingertip is available, the device can attempt to estimate the fingertip position using only information known about the user, such as the size of the user's hand, length of the user's finger, and other such information. The device can also use any information that was obtained before the fingertip passed outside the field of view. If the sensor is able to detect the fingertip, the location of the fingertip as determined from the sensor can be used to improve the estimate that was generated based on the captured images. In at least some embodiments a self-capacitance sensor can be used to detect the fingertip position, as self-capacitance sensors can be operated at levels that allow fingertips to be detected at greater distances from the device than for mutual capacitance or other such approaches. Since self-capacitance approaches cannot accurately determine the concurrent locations of multiple objects or features, the self-capacitance approaches cannot alone be used to determine and track the locations of multiple features. Other embodiments can utilize one or more ultrasonic sensors to locate concurrent positions of multiple objects near the device. By combining the position estimates from the captured images with the potential feature locations from one or more device sensors, an accurate determination can be made of the relative locations of one or more features with respect to the device. The changes in these relative positions then can be monitored or tracked in order to determine motion or gesture input to the device, among other such aspects.

Various other functions and advantages are described and suggested below as may be provided in accordance with the various embodiments.

Figure 1:
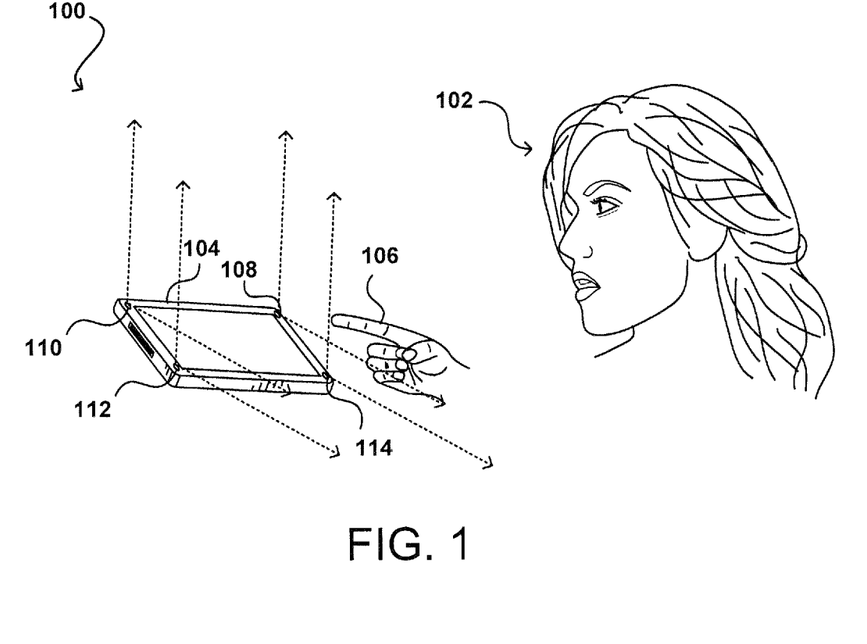
FIG. 1 illustrates an example situation wherein a user is interacting with a computing device in accordance with various embodiments.

FIG. 1 illustrates an example environment 100 in which aspects of the various embodiments can be implemented. In this example, a user 102 is attempting to provide gesture input to a computing device 104 using the user's finger 106. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable media players, among others.

In this example, the computing device 104 includes four cameras 108, 110, 112, 114 or other gesture sensors, configured to capture images including at least one view of the user's finger 106, which can be analyzed by an application executing on (or in communication with) the computing device to determine a relative location of the finger 106 to the computing device 104. The images can include still image or video data captured using ambient or infrared light, among other such options. Further, fewer or additional cameras of the same or different types can be used as well within the scope of the various embodiments. The application can determine the position of the finger, and can track the position of the finger over time by analyzing the captured image information, in order to allow for motion and/or gesture input to the device. For example, the user can move the finger up and down to adjust a volume, move the finger in a plane to control a virtual cursor, and the like. Multiple fingers and other objects or features can be tracked as well within the scope of the various embodiments.

Figure 2:
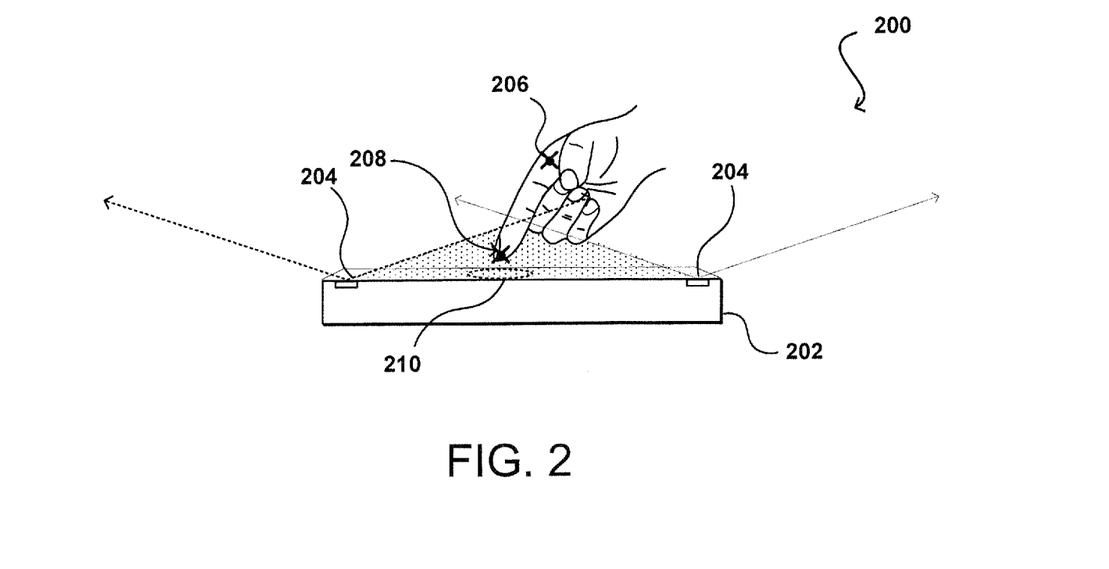
FIG. 2 illustrates an example situation wherein the approximate location of a fingertip of a user can be determined using images captured of a portion of a user's hand in accordance with various embodiments.

As illustrated in the example situation 200 of FIG. 2, however, relying on image data alone may not be sufficient to track a fingertip or other object over a full range of motion. In this example, the finger of the user passes outside the fields of view of the two cameras 204 shown on a device 202, passing into what is referred to herein as a "dead zone" 212 between the fields of view. As illustrated, a portion of the finger is within the field of view but the fingertip has passed into the dead zone 212. An approach in accordance with various embodiments can attempt to estimate the position of the fingertip based at least in part upon the portion of the finger or hand that is viewable in the field of view. For example, the device can attempt to locate a point 206 such as the base of the user's index finger, and use information about the shape and/or size of the user's hand, as well as the orientation of the hand, to attempt to estimate the location of the fingertip within a region of uncertainty 210, where the size of the region of uncertainty can be based upon factors such as how much of the finger is visible in the field of view of at least one camera and the orientation of the finger.

Figure 3A:
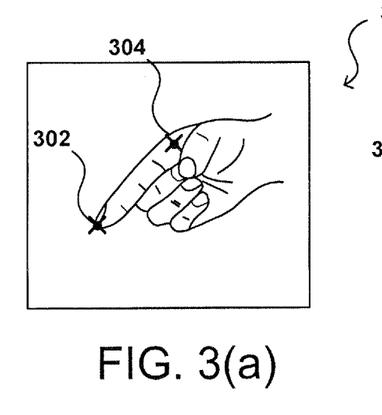
FIGS. 3(a) and 3(b) illustrate example images that can be captured using a pair of cameras in accordance with various embodiments.
Figure 3B:
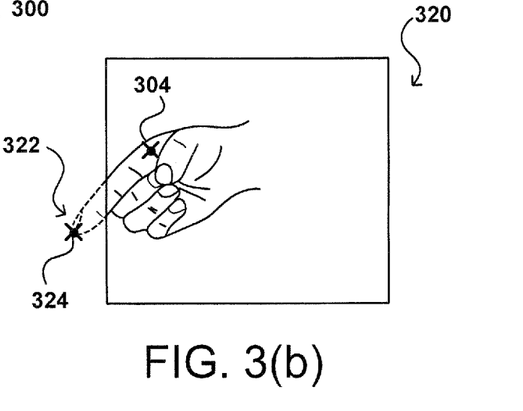

FIG. 3(a) illustrates an example image 300 that could be captured by one of the cameras of a computing device. In this example image, the hand of the user can clearly be seen. An application executing on the computing device (or at least in communication with the computing device) can analyze the image to locate the fingertip 302 and determine, based at least in part upon information known about the position and configuration of the camera, a relative position of the fingertip 302 with respect to the computing device. As discussed, however, relying on camera information can have certain drawbacks as each camera will generally have a limited field of view. Even fisheye or other wide-angle lenses have limited fields of view, or at least provide somewhat distorted images near the edge of the field of view. Accordingly, there will generally be one or more dead zones around the computing device where an object might fall outside the field of view of any of the cameras. For example, the image 320 of FIG. 3(b) illustrates a view from the same camera when the hand has moved towards the center of the device. As illustrated, the fingertip 322 has moved outside the field of view, and thus is not contained in the image, such that the device is unable to determine a point or position 324 corresponding to the fingertip location. Unless the fingertip entered the field of view of another camera, the device cannot view the fingertip in images captured from any of the cameras at that location.

In this example, the computing device can still see a portion of the hand, and using pattern recognition, image recognition, object recognition, or another such process can potentially still identify a portion, such as the finger base location 326, of the user's hand in the image 320. In at least some embodiments, the device can attempt to estimate, using statistical analysis or otherwise, the position of the user's fingertip using the visible portion of the user's hand. For example, if the device was able to view the user's fingertip at a point in the recent past and was able to determine the relative distance and direction of the fingertip to the base point 326, the device can use an extrapolation process to estimate that the fingertip point 324 is likely in a similar relative location. The device can track changes in the relative distance and orientation between the fingertip and base points, and can use these to estimate a location region for the fingertip when at least one of those points falls outside the viewable area of at least one camera of the device. As discussed, the estimated location region will typically have some uncertainty or error, represented by the size of the region, such that the estimate essentially corresponds to a region of probability, where the fingertip is likely contained within that region. The size and/or shape of the region can be based upon factors such as the distance from the device, the amount of the finger that can be seen in an image, the shape and size of the user's finger, the orientation of the hand and/or finger, and other such information.

In another embodiment, a computing device might store, or otherwise have access to, a model of the user's hand. Using information such as the size, shape, and relative configuration of the hand from the image information, the device can use the model to estimate a location region in which the fingertip should be located. Based at least in part upon the model and the base point 326, physical limitations of the user's finger and hand will mean that the fingertip position is limited to a determinable range of locations represented by the location region. Using information such as the visible portion of the finger and the orientation of the hand, the device can further limit the location region and, if a location can be determined with a reasonable amount of certainty or variation, that point can be used as the fingertip location 324. Various other such estimation approaches can be used as well within the scope of the various embodiments.

Figure 4:
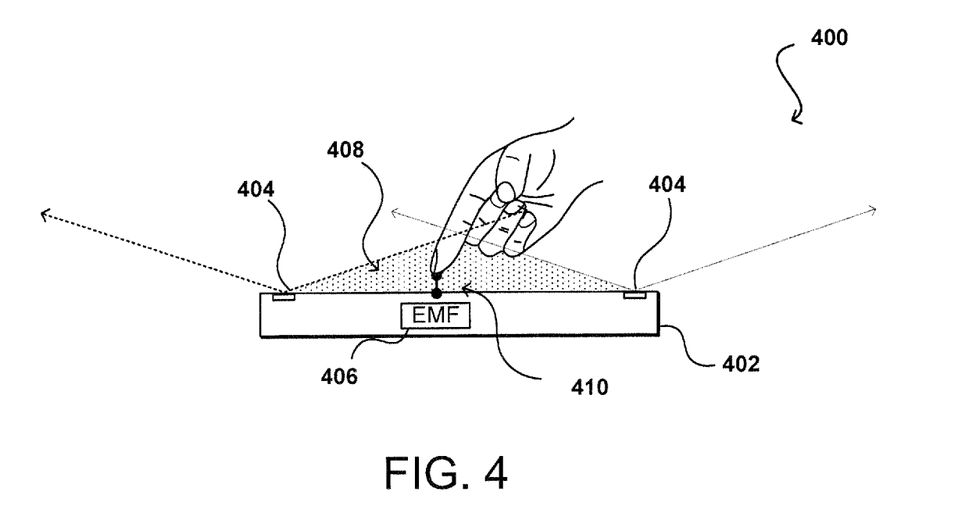
FIG. 4 illustrates an example situation wherein the location of a fingertip of a user can be determined using an electromagnetic field-based approach in accordance with various embodiments.

In at least some embodiments, a computing device might include one or more other types of sensors or components that can assist with fingertip location determinations in accordance with various embodiments. For example, FIG. 4 illustrates an example configuration 400 wherein a computing device includes a touch screen that is able to detect objects in contact with, or within a detectable distance of, the touch screen. The touch screen assembly can include at least one device sensor, in this example an electromagnetic field (EMF) sensor 406 (e.g., an EMF meter or EMF probe), operable to detect changes in an electromagnetic field resulting from a nearby object. The EMF sensor in this example can be any appropriate sensor, probe, meter, or other such element, operable to measure changes in EMF using broadband measurements, frequency-selective measurements, or any other such EMF-based approach. Similar other devices can be used as well, as can include mutual-capacitance and self-capacitance detection systems, or ultrasonic position detection sensors, for example, which determine the location of an object by detecting changes in capacitance near specific locations of the touch screen. Each of these technologies can detect an object such as a fingertip at a distance from the device, such that the position 410 of the fingertip with respect to the device 402 can be determined even when the fingertip is in the dead zone 408 between the fields of view of at least two cameras 404 on the device.

Figure 5:
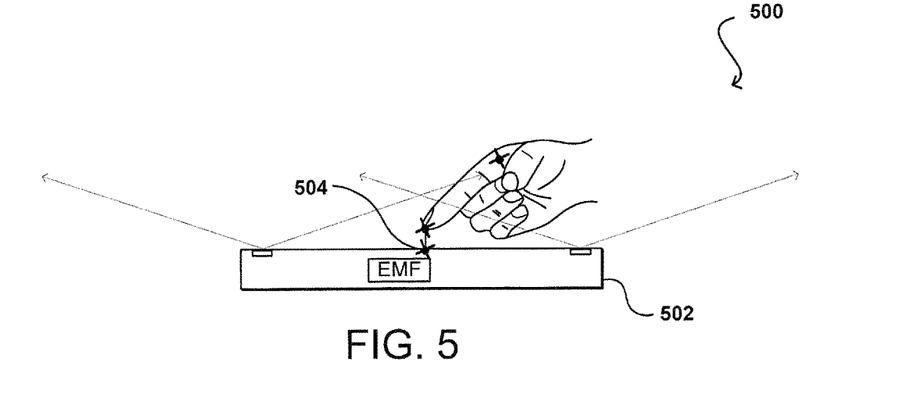
FIG. 5 illustrates an example situation wherein image and electromagnetic field (EMF) determinations can be used together to improve location determinations in accordance with various embodiments.

In this example, the range of the EMF extends over at least a majority of the dead zone 408, and in at least some embodiments can partially extend beyond the dead zone in order to provide more accurate and continuous determinations. As the tip of the user's finger moves towards the dead zone, the EMF sensor can detect a change in the field, which can be used to estimate a relative position 410 of the closest point of the fingertip in three dimensions. Approaches for locating an object based on changes in the electromagnetic field are known in the art and as such will not be discussed in detail herein. As illustrated in the example configuration 500 of FIG. 5, the position information from the EMF sensor can be combined with the information obtained from images captured by the cameras, and analyzed to attempt to determine an estimated position, in order to provide a more accurate determination of the fingertip position 504 with respect to the device 502.

While both mutual-capacitance and self-capacitance approaches can be used in various embodiments, mutual-capacitance approaches have a limited detection range away from the device, and thus can leave a large portion of the camera dead zone without the ability to locate a fingertip position. For example, the dead zone might extend up to two inches away from the device, and the mutual-capacitance detection might be able to be extended only up to a few millimeters or maybe centimeters. On the other hand, the power level of a self-capacitance sensor can be increased such that a self-capacitance sensor can sense objects up to about two inches away, covering at least most of the dead zone of the device.

A potential downside to using self-capacitance over mutual-capacitance, however, is the fact that conventional self-capacitance approaches cannot accurately determine position when more than one object is detected. Self-capacitance approaches look at changes in capacitance for rows and columns of electrodes. If a single object is detected, that object will impact one area of crossings between rows and columns. Thus, the location can accurately be determined.

FIG. 6(*a*) illustrates an example situation 600 wherein a user is using two fingers 604, 606 to provide gesture, motion, or hover-based input to a computing device using location with respect to a display screen 602 of a computing device. While a self-capacitance approach can detect the positions of these objects within the area of the dead zone, the approach can have difficulty accurately reporting those positions. For example, consider the example 620 illustrated in FIG. 6(*b*). In this example the fingers have caused readings for two vertical electrodes 622, 624 and two horizontal electrodes 626, 628 of the sensor system. The device can read the change in each electrode and determine that contact was made at points where those electrodes cross. As illustrated in FIG. 6(*b*), however, the four electrodes cross at four locations 630, 632, 634, 636. The device in many cases will be unable to distinguish the points 630, 632 where the fingers actually are from the other points 634, 636 where the electrodes cross. Thus, self-capacitance approaches alone may not be accurate enough for many applications when multiple objects or features might be used or detected.

Figure 6A:
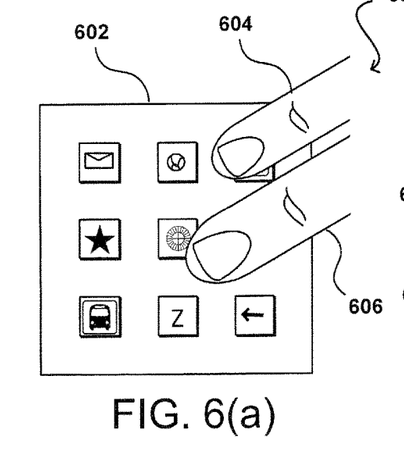
FIGS. 6(a), 6(b), 6(c), and 6(d) illustrate example situations wherein multiple fingertip locations can be determined using image and/or EMF-based approaches in accordance with various embodiments.
Figure 6B:
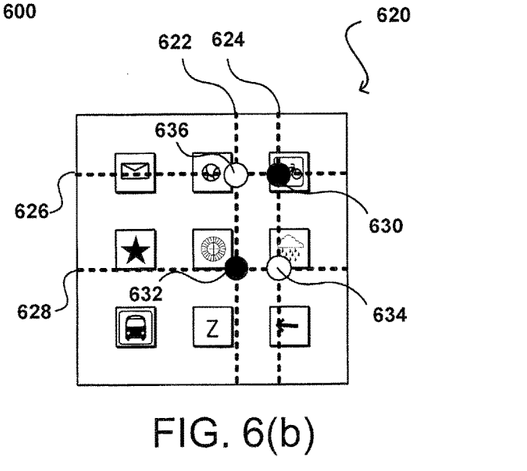
Figure 6C:
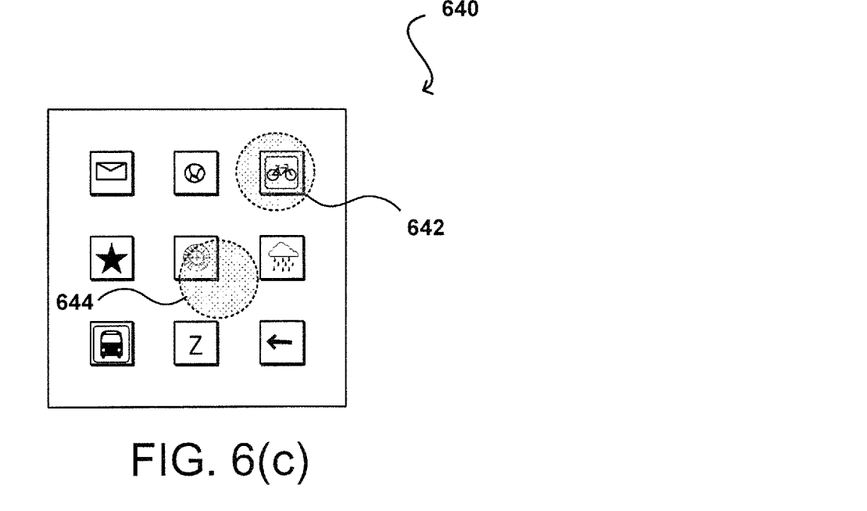
Figure 6D:
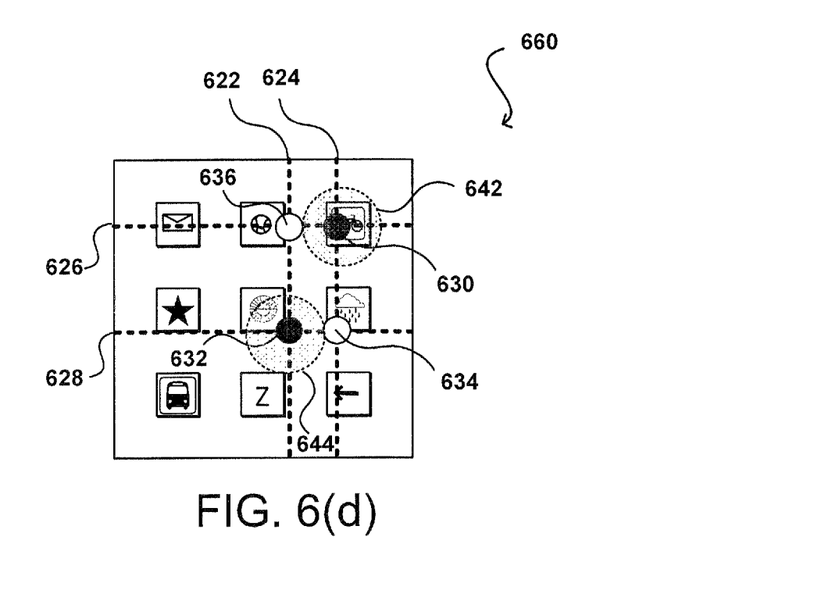

Approaches in accordance with various embodiments can utilize the fact that at least a portion of the user's hand or finger likely will be visible in a field of view of at least one camera to assist in determining the proper points from the self-capacitance component. For example, FIG. 6(*c*) illustrates a situation 640 wherein the fingers are positioned with respect to the screen as illustrated in FIG. 6(*a*). As discussed, the images of the hand and/or finger can be used to estimate an approximate location region 642, 644 for each of the fingers with respect to the device. The size of these approximate location regions will generally not be small enough to provide accurate results for input, particularly for small screens or small selectable objects on those screens. The location regions can, however, provide an indication of the area where each finger is located.

FIG. 6(*d*) illustrates an example situation 660 wherein information from the capacitance component and the captured images can be used to provide accurate indications of positions of multiple fingers or other such objects. As illustrated, the self-capacitance component can provide four potential locations 630, 632, 634, 636 for the two fingers using a self-capacitance approach. Analyzing the captured images can provide the approximate location regions 642, 644 of the fingertips. By combining this information as illustrated in the figure, the two potential locations 630, 632 that fall within the approximate location regions 642, 644 can be determined to be the correct positions. The self-capacitance data provides more accurate position information than can be obtained from the images when the fingertips are outside the field of view, but the image information can help to indicate which positions correspond to actual fingertips of the user.

Figure 7:
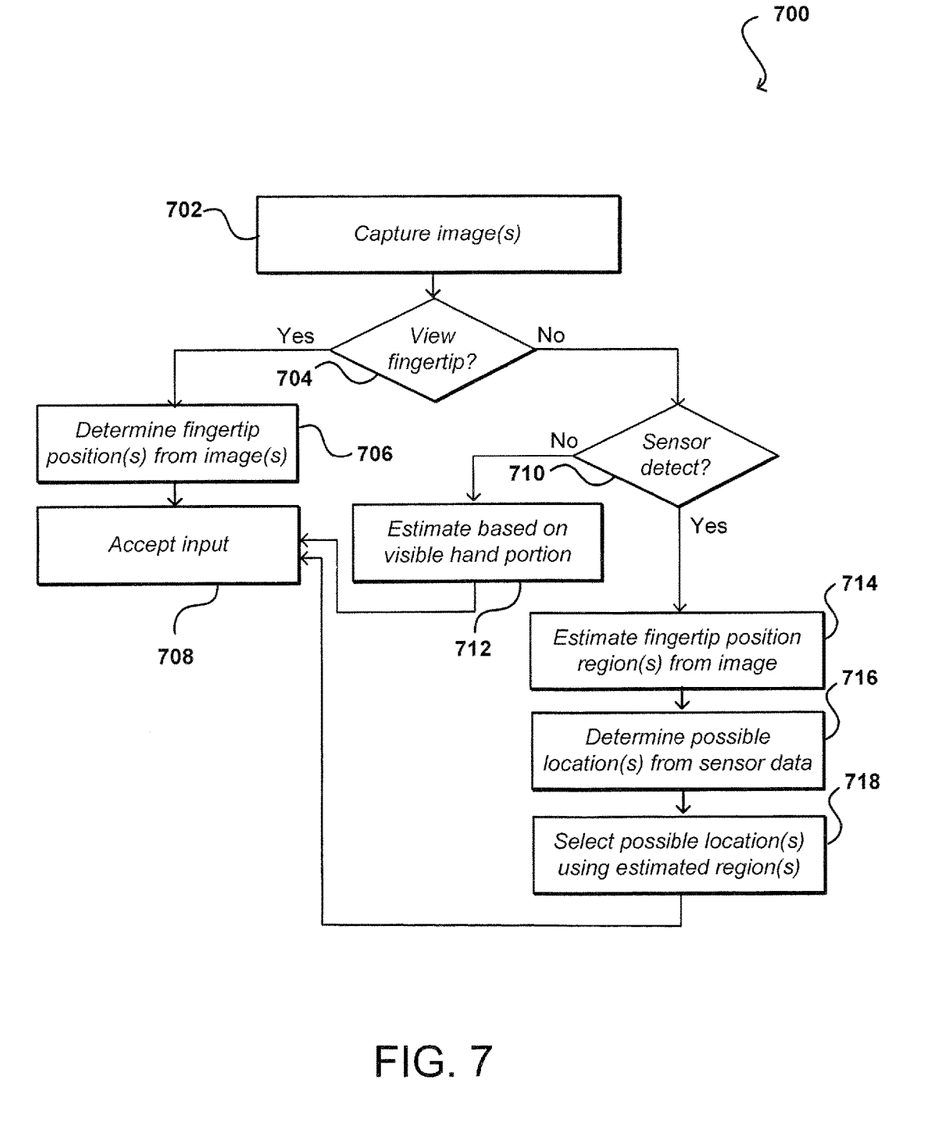
FIG. 7 illustrates an example process for determining the location of one or more fingertips that can be utilized in accordance with various embodiments.

FIG. 7 illustrates an example of such an approach 700 that can be utilized in accordance with various embodiments. It should be understood that there can be additional, fewer, or alternative steps performed in similar or alternative orders, or in parallel, within the scope of the various embodiments unless otherwise stated. Further, although a finger is used in this example, various other types of object or feature can be used as well within the scope of the various embodiments. In this example, image information is captured 702 using one or more cameras of a computing device. The image information can include video, stereo, or one or more still images. The image information can be analyzed to determine 704 whether the fingertip is visible in the captured image information. If so, the fingertip position can be determined 706 from the image information and an appropriate input can be determined and accepted 708.

If the fingertip cannot be viewed in the image information, a determination can be made 710 as to whether a sensor (e.g., EMF or ultrasonic component, etc.) of the device can detect the fingertip, or a portion of an object associated with the fingertip. If not, the fingertip position can be estimated 712 based at least in part upon the visible portion of the hand and/or finger, and appropriate input can be determined and accepted 708, such as to provide an appropriate input signal to an application executing on the computing device. As discussed, the estimation can include using models of the user's finger or hand, image information captured before the fingertip entered a dead zone, or other such information.

If the fingertip cannot be viewed but the sensor can detect the finger, a fingertip location region can be estimated 714 based at least in part upon the captured images. One or more possible locations of each fingertip can be determined 716 using the captured sensor data. If a single possible location is determined, that location can be accepted as input without using image data in at least some embodiments. A location for each finger then can be selected 718 from the possible locations based at least in part upon that location matching (at least within an acceptable matching threshold or distance) one of the estimated fingertip location regions. An appropriate input then can be determined 708 for each selected location, as discussed above.

As discussed, an EMF, capacitive, ultrasonic, or other field-based approach can give information that relates to the closest point of an object to the device and/or sensor. In many cases, however, this will be offset some amount from the actual tip of an object such as a finger, where that offset can increase with angle from normal, or orthogonal, to the plane of the surface of the device. For devices, such as smart phones, with small displays and/or elements, this offset might be enough to cause the wrong element to be selected by the device.

In some embodiments, an application executing on the device can use information about the object (e.g., finger) to infer the actual fingertip position from the detected position and base point, or other such data points. For example, the device can know the general size and/or shape of a user's finger, either using general information or information specific to the user. Knowing information such as the location of the base point and the closest determined point, the device can use a digital finger model, digital object model, or other information for determining a shape or orientation of a finger of a user or other such object, to determine where the fingertip point likely resides.

In some embodiments, the device can learn relative fingertip position through machine learning. For example, if a device estimates fingertip position and uses that to determine an input, then the user makes an adjustment or cancels that action and tries to cause an action for a slightly different location, the device can learn information about the offset for different angles and store that information for future determinations.

In some embodiments, the device can instead track the fingertip point as the finger moves towards the dead zone, and assume that the fingertip will follow a similar trajectory to the base point, which can help with the fingertip estimate. Various other estimation or adjustment processes can be used as well within the scope of the various embodiments.

Another potential issue with using capacitive sensors is that capacitive sensor data can be relatively noisy in at least some situations. The noise can result in ghost points, which can potentially be determined as potential fingertip positions. The noise also can limit the functional range of the sensor. Combining information from the captured images, however, can help disambiguate the ghost points as well as remove false positives due to noise. In the case of disambiguating ghost points, the information from the visual system can be used to give an initial estimate of the fingertip position(s). This initial estimate can then be compared against the possible fingertip positions returned by the capacitive sensor. In this way the true positions can be determined from the ghost points. It may also be possible to limit which areas of the capacitive sensor are active based on the visual information, allowing the capacitive sensor to run in a lower power mode by only activating regions near the position(s) estimated by the visual system.

In some embodiments, sensor data can be combined with image data to determine the location of objects away from a touch screen or other such element as well. For example, the device might have a casing or housing with portions that are outside the field of view of one or more cameras, and also outside the detection range of a sensor tied to a touch screen, such as may include an ultrasonic sensor or EMF sensor. The user might be able to provide input to the device by tapping on at least one of these portions of the device housing. If the device includes a motion sensor such as an accelerometer, inertial sensor, electronic gyroscope, or electronic compass, for example, the device can estimate the location of the tap based at least in part upon the change in orientation of the device. For example, if the user taps in the upper right hand corner of the device then the device can experience a small rotation in the direction of the tap. Such information can be combined with the image data and estimates of fingertip or object location to provide more accurate position information. Other approaches can be used as well, such as to use one or more vibration sensors at various locations in the device to determine relative vibrations at those locations for purposes of estimating a tap position.

Figure 8:
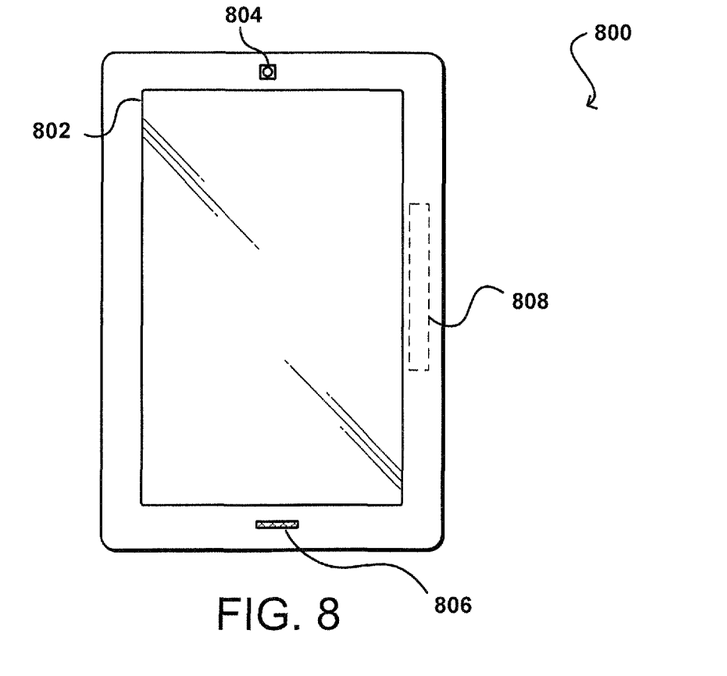
FIG. 8 illustrates an example device that can be utilized in accordance with various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 800 also includes at least one microphone 806 or other audio capture device capable of capturing audio data, such as words or commands spoken by a user of the device, music playing near the device, etc. In this example, a microphone 806 is placed on the same side of the device as the display screen 802, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 800 also includes at least one orientation sensor 808, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 9:
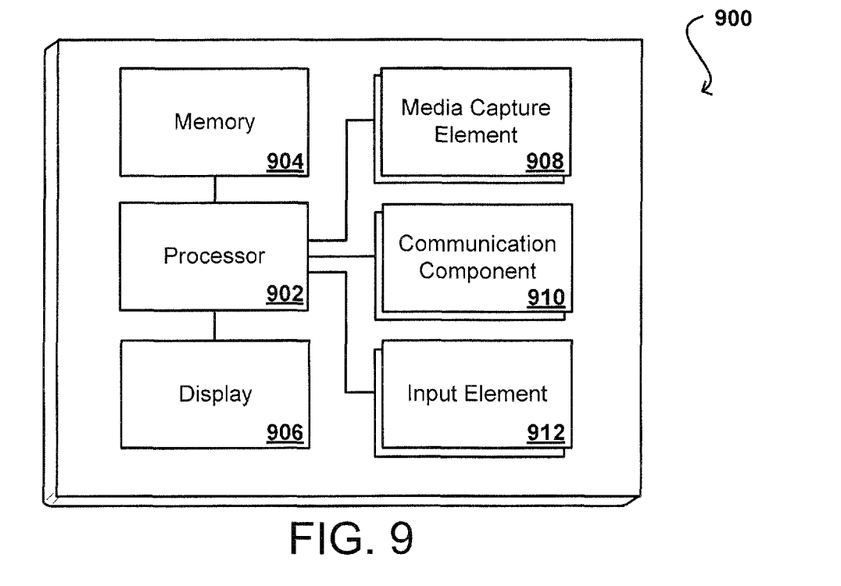
FIG. 9 illustrates an example set of components that can be utilized in a device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one media capture element 908 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 900 of FIG. 9 can include one or more communication components 910, such as a Wi-Fi, Bluetooth, RF, wired, or wireless communication system. The device in many embodiments can communicate with a network, such as the Internet, and may be able to communicate with other such devices. In some embodiments the device can include at least one additional input element 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 10:
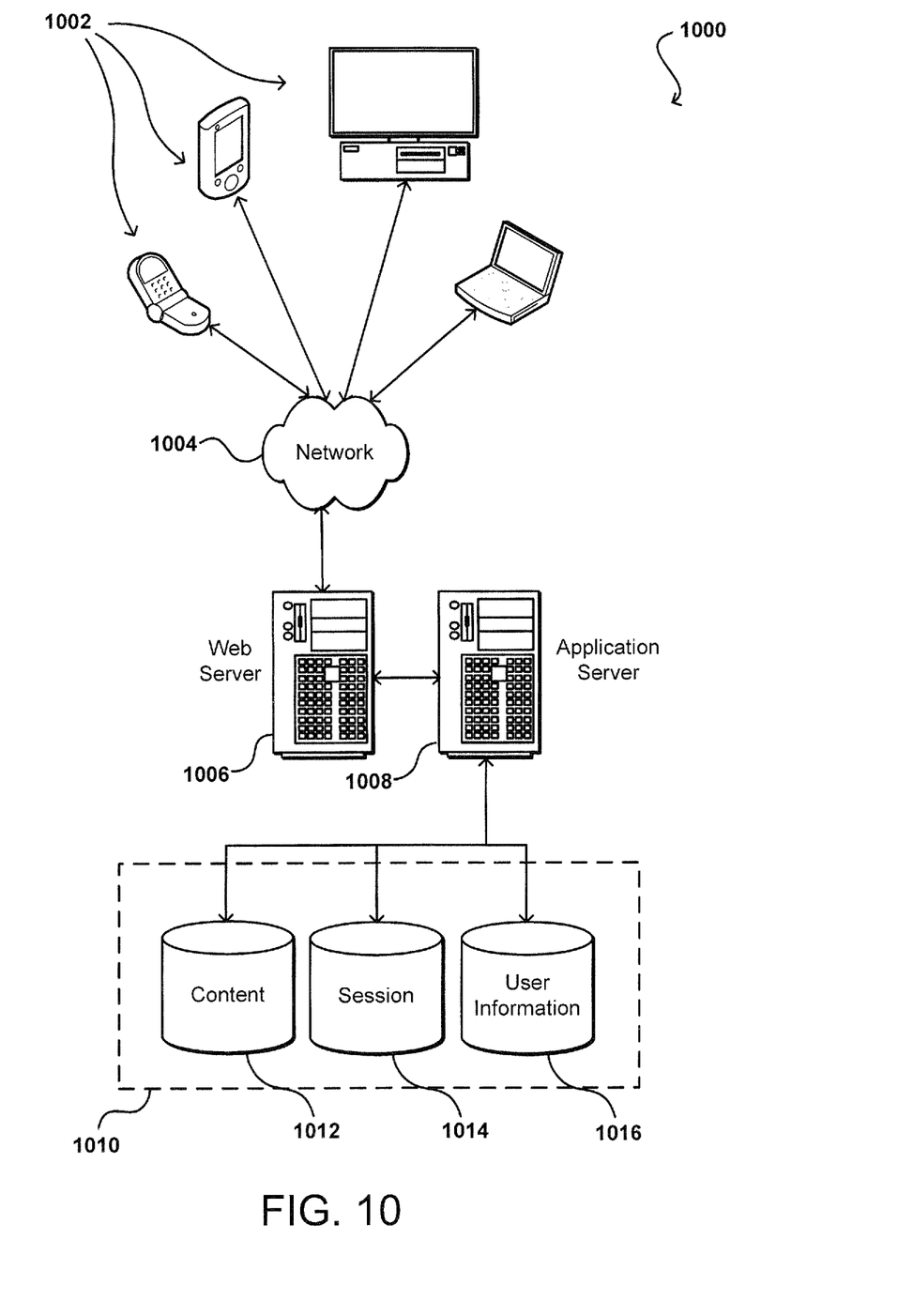
FIG. 10 illustrates an example an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1002. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
capturing first image data using a camera of a computing device;
determining that there is one fingertip within a threshold distance of the computing device represented in the first image data;
activating a self-capacitance mode of the computing device, the computing device capable of operating in at least the self-capacitance mode and mutual capacitance mode;
detecting, using at least one capacitance sensor of the computing device operating in the self-capacitance mode, a position of the computing device closest to the fingertip when the computing device is not contacting the fingertip;
capturing second image data using the camera;
determining that there is more than one fingertip within the threshold distance represented in the second image;
activating the mutual capacitance mode of the computing device;
detecting, using at least one capacitance sensor of the computing device operating in the mutual capacitance mode, a first position of the computing device closest to a first fingertip when the computing device is not contacting the first fingertip; and
detecting, using at least one capacitance sensor of the computing device operating in the mutual capacitance mode, a second position of the computing device closest to a second fingertip when the computing device is not contacting the second fingertip.

2. The computer-implemented method of claim 1, further comprising:
determining orientation information associated with at least one portion of a hand represented in the first image data; and
comparing the orientation information to a digital finger model.

3. The computer-implemented method of claim 1, further comprising:
tracking a movement of the fingertip within a period of time that the computing device is operating in the self-capacitance mode; and
determining a gesture corresponding to the movement.

4. The computer-implemented method of claim 3, further comprising:
providing an input signal to an application executing on the computing device, the input signal corresponding to the gesture.

5. A computer-implemented method, comprising:
capturing first image data using one or more cameras of a computing device;
determining that there is one object within a threshold distance of the computing device represented in the first image data;
activating a self-capacitance mode of the computing device;
detecting, using one or more capacitance sensors of the computing device within a first period of time that the computing device is operating in the self-capacitance mode, a position of the computing device closest to the object when the computing device is not contacting the object;
capturing second image data using the one or more cameras;
determining that there is more than one object within the threshold distance represented in the second image;
activating the mutual capacitance mode of the computing device;
detecting, using one or more capacitance sensors within a second period of time that the computing device is operating in the mutual capacitance mode, a first position of the computing device closest to a first object when the computing device is not contacting the first object; and
detecting, within the second period of time, a second position of the computing device closest to a second object when the computing device is not contacting the second object.

6. The computer-implemented method of claim 5, further comprising:
determining that there is one finger or one stylus within the threshold distance represented in the first image data.

7. The computer-implemented method of claim 5, further comprising:

determining orientation information associated with the object represented in the first image data; and comparing the orientation information to orientation information associated with an object model.

8. The computer-implemented method of claim 5, further comprising:

detecting a plurality of potential positions of the object within the threshold distance; and rejecting at least one of the plurality of potential positions that corresponds to noise.

9. The computer-implemented method of claim 5, further comprising:

deactivating one or more capacitance sensors of the computing device positioned away from the position closest to the object.

10. The computer-implemented method of claim 5, further comprising:

providing the first position and the second position as a single input to the computing device.

11. The computer-implemented method of claim 5, further comprising:

capturing the first image data as at least one of still image information, stereoscopic image information, infrared image information, or video information.

12. The computer-implemented method of claim 5, further comprising:

storing at least one previously detected position of the computing device closest to the object; and initiating detection of at least one portion of the object represented in the first image data based at least in part upon the at least one previously detected position.

13. The computer-implemented method of claim 5, further comprising:

tracking a movement of the object within a period of time that the computing device is operating in the self-capacitance mode; and determining a gesture corresponding to the movement.

14. The computer-implemented method of claim 5, further comprising:

determining physical characteristics of a specific user; and detecting at least one portion of the object represented in the first image data based at least in part upon the physical characteristics.

15. The computer-implemented method of claim 5, further comprising:

detecting a change in orientation of the computing device; and detecting at least one portion of the object represented in the first image data based at least in part upon the change in orientation.

16. A computing device, comprising:

one or more processors;

one of more cameras;

one or more capacitance sensors; and a memory device including instructions that, when executed by the one or more processors, cause the computing device to:

capture the first image data using one or more cameras of the computing device;

determine that there is one object within a threshold distance of the computing device represented in the first image data;

activate a self-capacitance mode of the computing device;

detect, using the one or more capacitance sensors within a period of time that the computing device is operating in the self-capacitance mode, a position of the computing device closest to the object when the computing device is not contacting the object;

capture second image data using the one or more cameras;

determine that there is more than one object within the threshold distance represented in the second image data;

activate a mutual capacitance mode of the computing device;

detect, using the one or more capacitance sensors within a second period of time that the computing device is operating in a mutual capacitance mode, a first position of the computing device closest to a first object when the computing device is not contacting the first object; and detect, within the second period of time, a second position of the computing device closest to a second object when the computing device is not contacting the second object.

17. The computing device of claim 16, wherein the instructions when executed further cause the computing device to:

determine orientation information associated with the object represented in the first image data; and compare the orientation information to orientation information associated with an object model.

18. The computing device of claim 16, wherein the instructions when executed further cause the computing device to:

track a movement of the object within a period of time that the computing device is operating in the self-capacitance mode; and determine a gesture corresponding to the movement.

19. A non-transitory computer-readable storage medium including instructions that, when executed by one or more processors of a computing device, cause the computing device to:

capture first image data using one or more camera of the computing device;

determine that there is more than one object within a threshold distance of the computing device represented in the first image data;

activate a self-capacitance mode of the computing device;

detect, using one or more capacitance sensor of the computing device within a first period of time that the computing device is operating in a self-capacitance mode, a position of the computing device closest to the object when the computing device is not contacting the object;

capture second image data using the one or more cameras;

determine that there is more than one object within the threshold distance represented in the second image data;

activate a mutual capacitance mode of the computing device;

detect, using the one or more capacitance sensors within a second period of time that the computing device is operating in the mutual capacitance mode, a first position of the computing device closest to a first object when the computing device is not contacting the first object; and detect, within the second period of time, a second position of the computing device closest to a second object when the computing device is not contacting the second object.

20. The non-transitory computer-readable storage medium of claim 19, wherein the instructions when executed further cause the computing device to:

determine orientation information associated with the object represented in the first image data; and compare the orientation information to orientation information associated with an object model.

21. The non-transitory computer-readable storage medium of claim 19, wherein the instructions when executed further cause the computing device to:

track a movement of the object within a period of time that the computing device is operating in the self-capacitance mode; and determine a gesture corresponding to the movement.

22. The non-transitory computer-readable storage medium of claim 21, wherein the instructions when executed further cause the computing device to:

provide an input signal to an application executing on the computing device, the input signal corresponding to the gesture.

* * * * *